United States Patent [19]

Yoshioka et al.

[11] Patent Number: 5,677,827
[45] Date of Patent: Oct. 14, 1997

[54] NOTEBOOK TYPE PERSONAL COMPUTER AND BATTERY CASE

[75] Inventors: Kiyoharu Yoshioka, Yokohama; Hiroya Miura, Tokyo; Munenori Shusa, Kawasaki, all of Japan

[73] Assignee: Canon Kabushiki Kaisha, Tokyo, Japan

[21] Appl. No.: 383,185

[22] Filed: Feb. 3, 1995

[30] Foreign Application Priority Data

Feb. 4, 1994 [JP] Japan ................. 6-012703

[51] Int. Cl.$^6$ ................. G06F 1/16
[52] U.S. Cl. ................. 361/683; 361/680; 429/97
[58] Field of Search ................. 364/708.1; 361/680–683; 345/169; 429/97

[56] References Cited

U.S. PATENT DOCUMENTS

| | | | |
|---|---|---|---|
| 5,019,465 | 5/1991 | Herron et al. | 429/97 |
| 5,107,401 | 4/1992 | Youn | 361/393 |
| 5,473,347 | 12/1995 | Collas et al. | 345/169 |

FOREIGN PATENT DOCUMENTS

| | | |
|---|---|---|
| 9407234 | 3/1994 | European Pat. Off. |
| 01255022 | 10/1989 | Japan. |
| 02244210 | 9/1990 | Japan. |
| 05143192 | 6/1993 | Japan. |
| 051433192 | 6/1993 | Japan. |
| 05250068 | 9/1993 | Japan. |
| WOA9407234 | 3/1994 | WIPO. |

*Primary Examiner*—Reba I. Elmore
*Assistant Examiner*—Monica Lewis
*Attorney, Agent, or Firm*—Fitzpatrick, Cella, Harper & Scinto

[57] ABSTRACT

The invention aims at providing a notebook type personal computer having an improved portability. In order to achieve this object, a battery, case which houses a battery B for supplying a power to a personal computer body is detachably attached to a housing. The battery case has such a shape that it also serves as a palm rest used when a keyboard is operated. The battery case has a battery case body for housing the battery B, and an attaching/detaching portion connected to the battery case body and attached to and detached from the housing. The battery case body is connected to the attaching/detaching portion to be pivotal in a direction of thickness of the housing.

11 Claims, 4 Drawing Sheets

NOTEBOOK TYPE PERSONAL COMPUTER AND BATTERY CASE

BACKGROUND OF THE INVENTION

The present invention relates to a notebook type personal computer in which a battery pack for supplying power to a personal computer body is detachably provided to the personal computer housing, and a battery case used by this notebook type personal computer.

In recent years, notebook type personal computers that can be carried easily so that they can be used at various places are widely used. Usually, a notebook type personal computer of this type can be driven both by a battery and an AC power supply. In the conventional notebook type personal computer, the battery is housed in the palm rest in front of the keyboard of a keyboard housing, or behind the keyboard.

In the above conventional arrangement, however, since an extra space for housing the battery is required in the front or rear portion of the keyboard housing, the dimension of the keyboard housing in the front-to-rear direction is increased. Then, when the personal computer is to be carried by closing the display housing, the size of the entire personal computer becomes large, thereby interfering with the easiness in carrying the personal computer.

SUMMARY OF THE INVENTION

The present invention has been made in view of the above situation, and has as its object to provide a notebook type personal computer having an improved portability, and a battery case.

In order to solve the above problem and to achieve the above object, a notebook type personal computer according to the present invention has the following arrangement. More specifically, there is provided a notebook type personal computer in which at least a personal computer body, a keyboard for inputting predetermined data to the personal computer body, and a display for displaying data input by the keyboard or data processed by the personal computer body are stored in a predetermined housing wherein the notebook type personal computer comprises a battery case which houses a battery for supplying a power to the personal computer body, which is detachably attached to the housing, and which has such a shape to also serve as a palm rest used when the keyboard is operated, the battery case having a battery case body for housing the battery, and an attaching/detaching portion connected to the battery case body and attached to and detached from the housing, and the battery case body being connected to the attaching/detaching portion to be pivotal in a thickness direction of the housing.

A battery case according to the present invention has the following arrangement. More specifically, there is provided a battery case which houses a battery for supplying a power to a body of a notebook type personal computer, which can be attached to and detached from a housing of the notebook type personal computer, and which has such a shape to serve also as a palm rest used when a keyboard of the notebook type personal computer is operated, wherein the battery case comprises a battery case body for housing the battery, and an attaching/detaching portion connected to the battery case body and attached to and detached from the housing, the battery case body having a first pointing device button disposed thereon.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENT

A preferred embodiment of the present invention will be described in detail with reference to the accompanying drawings.

Figure 1:
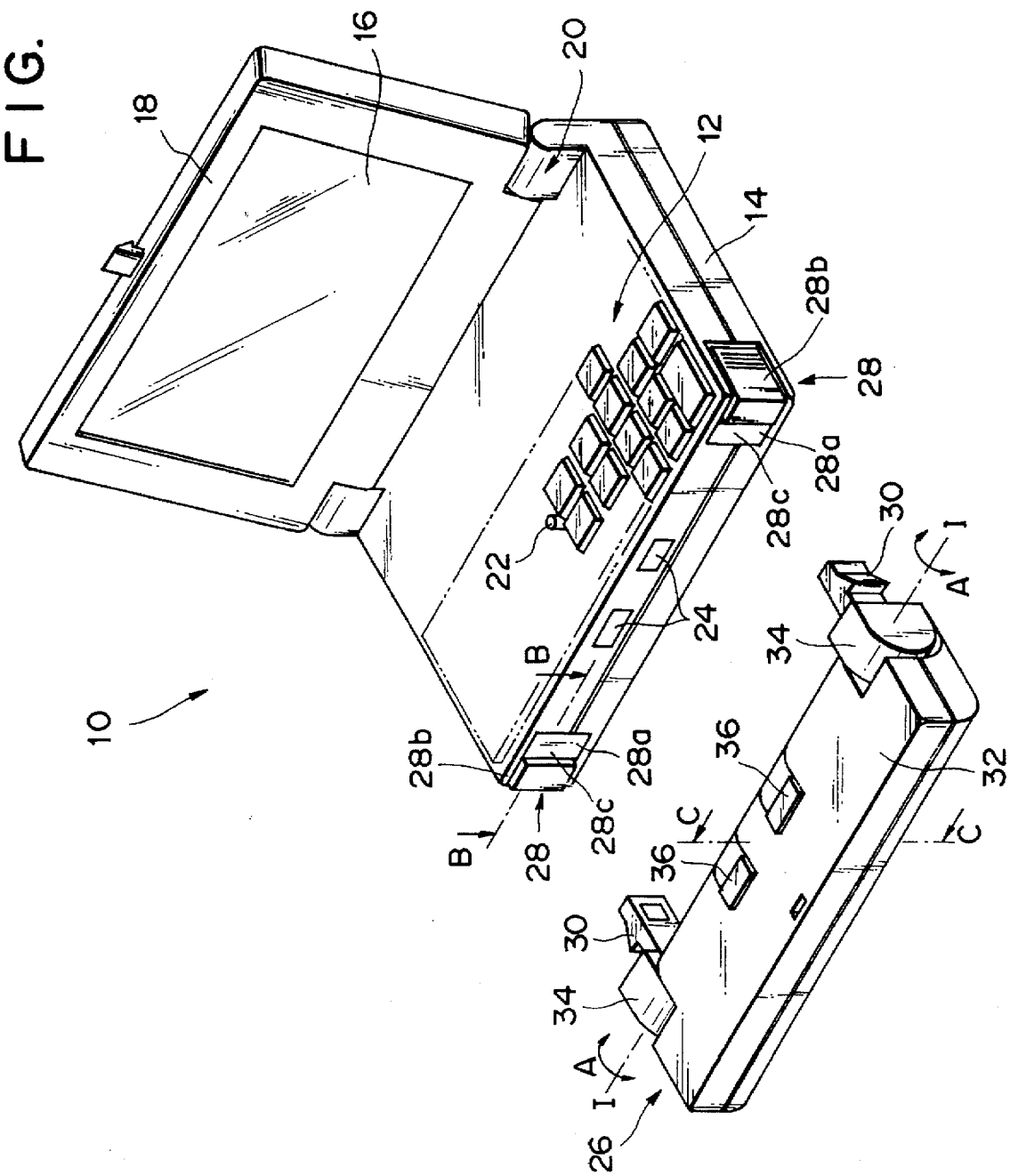
FIG. 1 is a perspective view showing the overall structure of a notebook type personal computer and its battery case according to an embodiment of the present invention.

FIG. 1 is a perspective view showing the overall structure of a notebook type personal computer and its battery case according to the embodiment of the present invention.

Referring to FIG. 1, as is well known conventionally, a notebook type personal computer 10 has a keyboard housing 14 housing a personal computer body (not shown) and a keyboard 12 for inputting predetermined data to the personal computer body, and a display housing 18 housing a display 16 for displaying data input from the keyboard 12, data processed in the personal computer body, and the like. The display housing 18 is supported through hinges 20 to be openable/closable with respect to the keyboard housing 14. A movable stick 22 for moving an arrow or the like on the display 16 is disposed at substantially the center of the keyboard housing 14. Pointing device buttons 24 for pointing a predetermined point on the screen with the arrow moved on the display 16 by the movable stick 22 are disposed on the front end face of the keyboard housing 14.

Attaching/detaching portions 28 for attaching/detaching a battery case 26 to/from the keyboard housing 14 are disposed at right and left end portions of the front end face of the keyboard housing 14. Each attaching/detaching portion 28 mainly consists of an open hole 28a into which a corresponding locking pawl portion 30 of the battery case 26 is to be inserted, and an attaching/detaching lever 28b for engaging/disengaging the locking pawl portion 30 with/from the keyboard housing 14. When the battery case 26 is removed from the keyboard housing 14 (the state shown in FIG. 1), the open hole 28a is closed by a corresponding shutter 28c, so that dust and the like will not easily enter the interior of the keyboard housing 14.

The battery case 26 mainly consists of a case body portion 32 for housing batteries, and attaching/detaching portions 34 connected to the case body portion 32 and attachable to and detachable from the keyboard housing 14. The attaching/detaching portions 34 are connected to the case body portion 32 so as to be pivotal about a central axis I shown in FIG. 1 in directions indicated by a double-headed arrow A. Each locking pawl portion 30 (described above) which engages with and disengages from the corresponding attaching/detaching portion 28 of the keyboard housing 14 is formed at the distal end portion of the corresponding attaching/detaching portion 34. When the locking pawl portions 30 are inserted in the open holes 28a of the keyboard housing 14, the battery case 26 is integrally connected to the keyboard housing 14.

Pointing device buttons 36 are arranged at substantially the central portion of the upper surface of the battery case 26. When the battery case 26 is connected to the keyboard housing 14, the pointing device buttons 24 of the keyboard housing 14 are covered with the battery case 26 and thus cannot be operated externally. For this reason, the pointing device buttons 36 are provided to the battery case 26 and interlocked to the pointing device buttons 24 of the keyboard housing 14 through a link mechanism (to be described later). Therefore, the pointing device buttons 24 can be externally operated even when the battery case 26 is attached to the keyboard housing 14.

Figure 2:
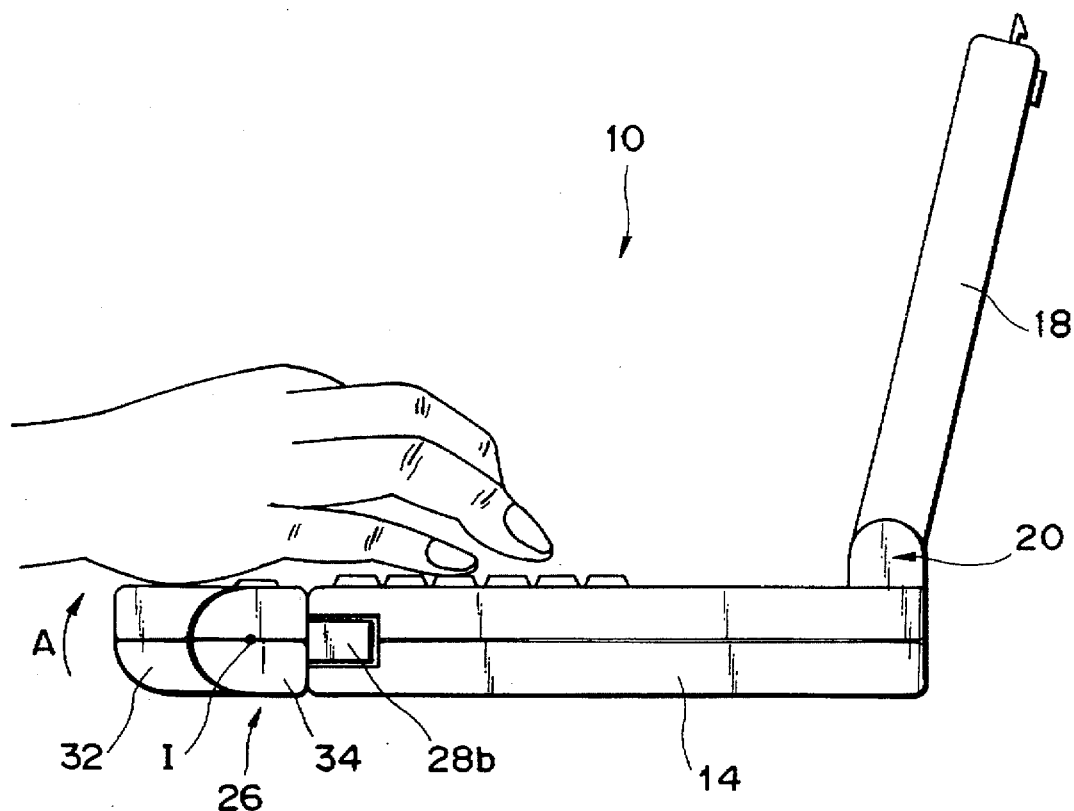
FIG. 2 is a side view showing a state wherein the battery case is mounted on the housing.

FIG. 2 is a side view showing a state wherein the battery case 26 is mounted on the keyboard housing 14. The battery case 26 is formed into such a shape that it serves as a palm rest when the operator operates the keyboard. When the battery case 26 is mounted on the keyboard housing 14, as shown in FIG. 2, the operator can operate the keyboard easily.

Figure 3:
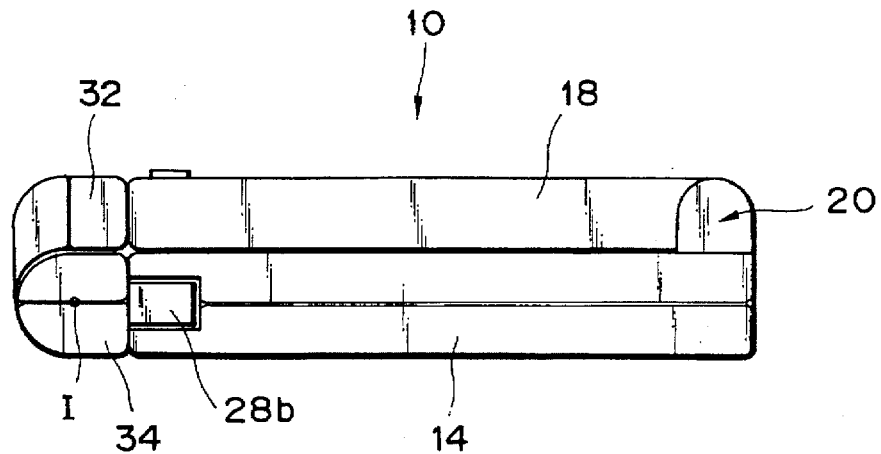
FIG. 3 is a view showing a state wherein a display housing is closed and the case body portion of the battery case is folded in order to carry the notebook type personal computer.

FIG. 3 is a view showing a state wherein the display housing 18 is closed and the case body portion 32 of the battery case 26 is folded in order to carry the notebook type personal computer 10. Since the case body portion 32 of the battery case 26 is pivotal about the central axis I in a direction indicated by an arrow A in FIG. 2, as described above, when the case body portion 32 is folded, the notebook type personal computer 10 has a compact shape as shown in FIG. 3 when compared to the using state shown in FIG. 2, thereby improving portability.

Figure 4:
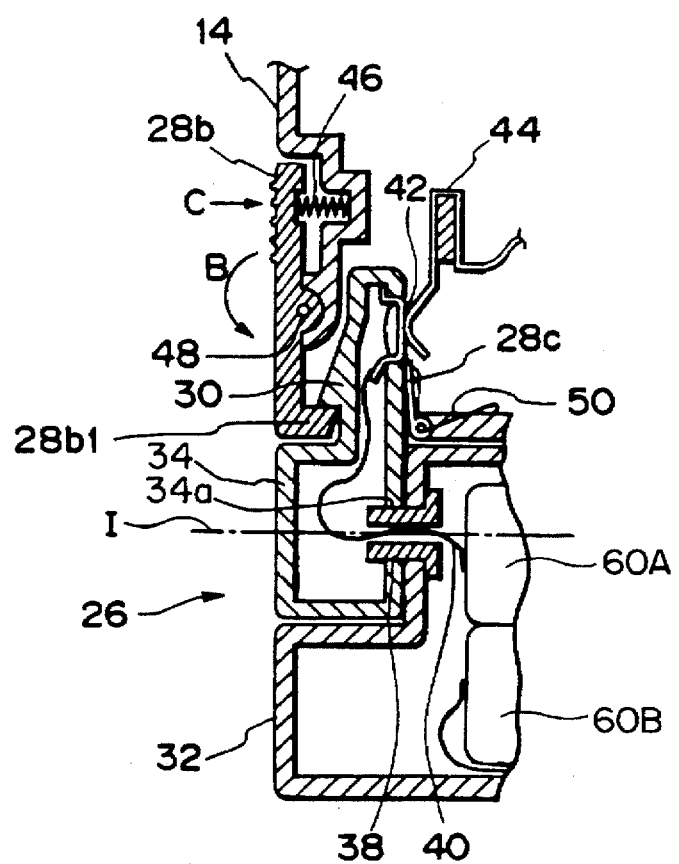
FIG. 4 is a sectional view taken along the line B—B of FIG. 1.

FIG. 4 is a sectional view taken along the line B—B of FIG. 1. Cylindrical bushes 38 having flange portions are attached to the two end portions of the case body portion 32 of the battery case 26. The attaching/detaching portions 34 are slidably mounted on the bushes 38 through fitting holes 34a. The attaching/detaching portions 34 are pivotal about the central axis I in a manner as shown in FIGS. 1 and 2 through slidable fitting of the bushes 38 and the fitting holes 34a. Power supply lines 40 extend from batteries 60A and 60B stored in the case body portion 32 into the attaching/detaching portions 34 through the central holes of the bushes 38. The distal end portion of each power supply line 40 is connected to a corresponding electrical contact 42 attached to the inner side of the corresponding attaching/detaching portion 34. When the battery case 26 is connected to the keyboard housing 14 (the state shown in FIG. 4), the electrical contacts 42 are in contact with electrical contacts 44 arranged in the keyboard housing 14. Power from the batteries 60A and 60B is supplied to the personal computer body arranged in the keyboard housing 14 through the electrical contacts 42 and 44.

Distal end portions 28b1 of the attaching/detaching levers 28b are engaged with the locking pawl portions 30 of the attaching/detaching portions 34. Thus, once the battery case 26 is mounted on the keyboard housing 14, the battery case 26 will not be easily removed from the keyboard housing 14. To remove the battery case 26 from the keyboard housing 14, a force is applied by fingers to the attaching/detaching levers 28b, biased by springs 46 in a direction indicated by an arrow B about pivot shafts 48, in a direction indicated by an arrow C in FIGS. 4 and 5, in order to pivot the attaching/detaching levers 28b in a direction opposite to that of the arrow B (i.e., in the direction of an arrow D), thereby disengaging the distal end portions 28b1 of the attaching/detaching levers 28b from the locking pawl portions 30. Then, the battery case 26 can be removed from the keyboard housing 14.

Figure 5:
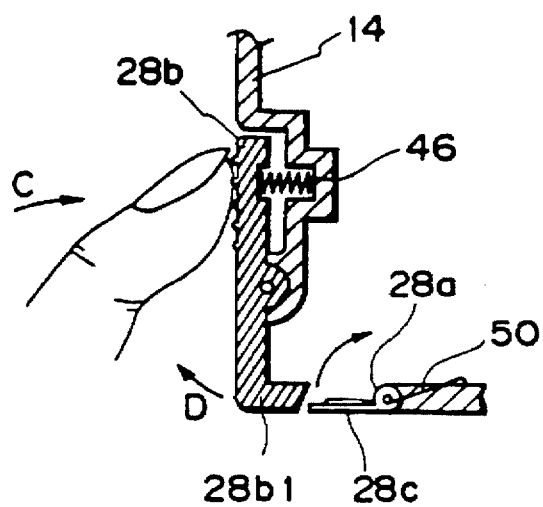
FIG. 5 is a view showing how to remove the battery case.

As described above, the open holes 28a are respectively provided with the shutters 28c, as shown in FIGS. 4 and 5. The shutters 28c are constantly biased by corresponding torsion springs 50 in a direction to close the open holes 28a. Accordingly, when the attaching/detaching portions 34 enter the open holes 28a, the shutters 28c are opened against the biasing force of the torsion springs 50; when the attaching/detaching portions 34 come out of the open holes 28a, the shutters 28c naturally close the open holes 28a.

Figure 6:
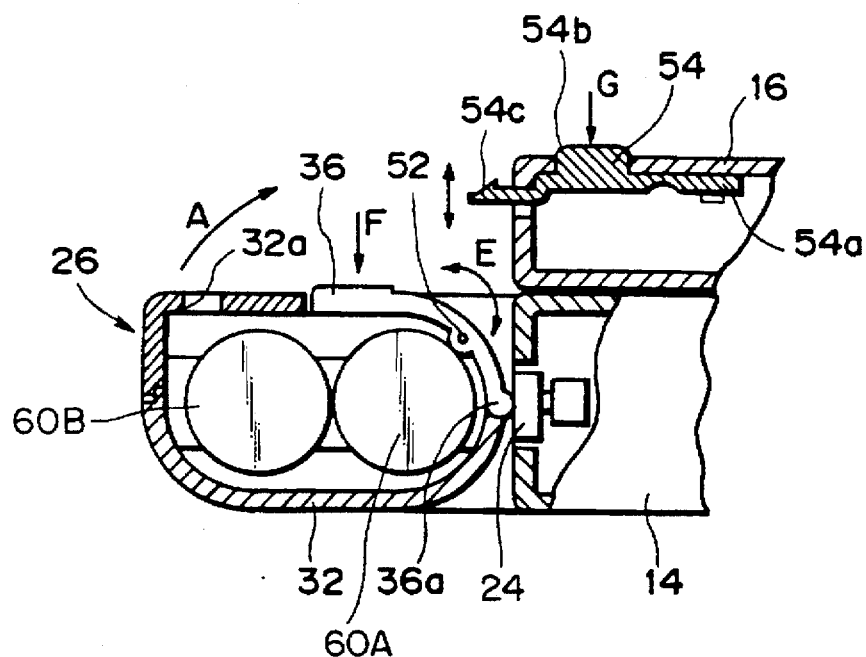
FIG. 6 is a sectional view taken along the line C—C of FIG. 1.

FIG. 6 is a sectional view taken along the line C—C of FIG. 1, showing a state wherein the battery case 26 is connected to the keyboard housing 14.

As shown in FIG. 6, two rows of the batteries 60A and 60B are stored in the case body portion 32 of the battery case 26. As described above, the pointing device buttons 36 are arranged on the upper portion of the case body portion 32. The pointing device buttons 36 are supported by the case body portion 32 to be pivotal about pivot shafts 52 in a direction indicated by an arrow E. Accordingly, when a pointing device button 36 is depressed from above with a finger in a direction indicated by an arrow F, a distal end portion 36a of this pointing device button 36 pushes the corresponding pointing device button 24 of the keyboard housing 14. Thus, even when the battery case 26 is mounted on the keyboard housing 14, the pointing device buttons 24 can be externally operated because of the linkage of the pointing device buttons 36 with the pointing device buttons 24. Since the pointing device buttons 36 comprise a simple link mechanism, as described above, they will not occupy a large space in the battery case 26, thereby preventing an increase in size of the battery case 26.

A locking member 54 for locking the battery case 26 in the folded state is attached to the display housing 18. A proximal end portion 54a of the locking member 54 is fixed to the housing 18. When a button portion 54b of the locking member 54 is depressed in a direction indicated by an arrow G, a locking pawl 54c at the distal end portion of the locking member 54 is vertically moved by its own elasticity.

Figure 7:
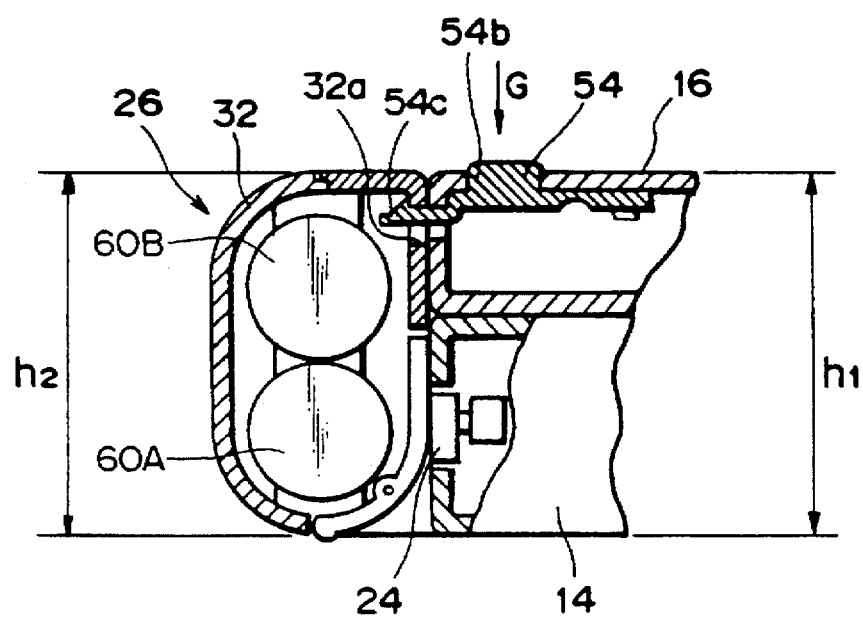
FIG. 7 is a sectional view showing a state wherein the battery case is folded.

An open hole 32a which engages with the locking pawl 54c is formed in the case body portion 32 of the battery case 26. Accordingly, when the case body portion 32 is pivoted in a direction indicated by an arrow A in FIG. 6 to engage the locking pawl 54c with the open hole 32a, as shown in FIG. 7, the case body portion 32 is held in the folded state. In this state, when the button portion 54b of the locking member 54 is depressed in the direction indicated by the arrow G, the locking pawl 54c is moved downward. The engagement of the locking pawl 54c with the open hole 32a is then canceled, thereby restoring the battery case 26 to an open state.

While the battery case 26 is folded, a thickness h1 as the sum of the thicknesses of the housings 14 and 18 and the thickness of the battery case 26 are substantially equal. Thus, the stability of the notebook type personal computer 10 during carrying and when placed somewhere is ensured.

As described above, in the above embodiment, since the battery case has a shape of the palm rest and is detachable from the personal computer housing, when this personal computer is to be carried for use at a place where an AC power supply is available, it can be carried after removing the battery case. As this personal computer can be carried as a smaller-size personal computer than conventional personal computers by the size of the battery case, the portability is improved. In this case, due to the absence of the palm rest portion, the operability of the keyboard is slightly degraded. However, the easiness in carrying sufficiently compensates for this degradation.

When this personal computer is to be carried for use at a place where an AC power supply is not available, since the battery case body is pivotal in the thickness direction of the housing, the personal computer can be carried after folding the battery case, which also serves as a palm rest, toward the housing. Thus, the entire size of the personal computer is decreased when compared to conventional personal computers, improving the portability.

Since the thickness of the battery case when folded is substantially equal to the total thickness of the housings with the display closed, the entire personal computer has a box-like shape upon being folded. Thus, the stability of the personal computer during carrying and when placed somewhere is improved.

As the first pointing device buttons are arranged on the front end face of the personal computer housing, even when the personal computer is used with the AC power supply by removing the battery case, the operability of the pointing device buttons is improved.

Since the second pointing device buttons, which are interlocked to the first pointing device buttons mounted on the front end portion of the personal computer housing, are disposed on the battery case, even when the battery case is attached to the personal computer, the first pointing device buttons can be operated in the same manner as in a case wherein the battery case is removed.

Since the second and first pointing device buttons are linked to each other through the link mechanism, an interlocking mechanism is simplified and decreased in size, thereby preventing an increase in size of the battery case.

The present invention is not limited to the above embodiment and various changes and modifications can be made within the spirit and scope of the present invention. Therefore, to apprise the public of the scope of the present invention the following claims are made.

What is claimed is:

1. A notebook type personal computer comprising:

a keyboard portion for inputting data to said personal computer;

a display portion for displaying data input by said keyboard or data processed by said personal computer, said display portion being openably/closably connected to said keyboard portion; and a battery case which houses a battery for supplying a power to said personal computer, which is detachably attached to said keyboard portion, and which is shaped to serve as a palm rest used when said display portion is opened from said keyboard portion, said battery case having a battery case body for housing said battery, an attaching/detaching portion pivotably connected to said battery case body and attached to and detached from said keyboard portion, and a locking member which locks said display portion with said battery case body for maintaining a closed state of said display portion and said keyboard portion when said display portion is closed to said keyboard portion and said battery case body is pivoted.

2. The personal computer according to claim 1, wherein said housing comprises a first housing that houses said personal computer body and said keyboard, and a second housing connected to said first housing to be openable/closable and housing said display, and when said battery case body is pivoted in the thickness direction of said housing, said housing and said battery case have substantially equal thicknesses.

3. The personal computer according to claim 1, wherein a first pointing device button is arranged on an end face of said housing where said battery case is to be mounted, said first pointing device button being able to be directly operated from an outside of said housing when said battery case is removed.

4. The personal computer according to claim 3, wherein a second pointing device button is disposed on said battery case, said second pointing device button being interlocked to said first pointing device button in order to externally operate said first pointing device button when said battery case is connected to said housing to cover said first pointing device button.

5. The personal computer according to claim 4, wherein said second pointing device button is interlocked to said first pointing device button through a link mechanism.

6. The personal computer according to claim 1, wherein said attaching/detaching portion performs a mechanical and electrical connection of said battery case body and said keyboard portion when said attaching/detaching portion is attached to said keyboard portion.

7. The battery case according to claim 6, wherein said battery case body is connected to said attaching/detaching portion to be pivotal in a thickness direction of said housing.

8. The battery case according to claim 6, further comprising a second pointing device button which is connected to said housing, interlocked to said first pointing device button, and provided to an end face of said notebook type personal computer.

9. The battery case according to claim 7, wherein said first pointing device button is interlocked to said second pointing device button through a link mechanism.

10. The personal computer according to claim 1, wherein said battery case is locked to said display when said battery case pivoted.

11. The personal computer according to claim 6, wherein said battery case body has a first pointing device button disposed thereon.

* * * * *